US008139488B2

(12) United States Patent
Williams, Jr. et al.

(10) Patent No.: US 8,139,488 B2
(45) Date of Patent: Mar. 20, 2012

(54) COOPERATIVE FLOW LOCKS DISTRIBUTED AMONG MULTIPLE COMPONENTS

(75) Inventors: John J. Williams, Jr., Pleasanton, CA (US); Eric John Chesters, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 12/130,936

(22) Filed: May 30, 2008

(65) Prior Publication Data

US 2009/0296580 A1    Dec. 3, 2009

(51) Int. Cl.
*G01R 31/08* (2006.01)
(52) U.S. Cl. ......................... 370/235; 370/394
(58) Field of Classification Search .................. None
See application file for complete search history.

(56) References Cited

U.S. PATENT DOCUMENTS

| | | | |
|---|---|---|---|
| 5,682,537 A | 10/1997 | Davies et al. | |
| 5,699,500 A | 12/1997 | Dasgupta | |
| 6,161,144 A | 12/2000 | Michaels et al. | |
| 6,170,025 B1 | 1/2001 | Drottar et al. | |
| 6,405,274 B1 | 6/2002 | Chan | |
| 6,473,849 B1 | 10/2002 | Keller et al. | |
| 6,529,983 B1 | 3/2003 | Marshall et al. | |
| 7,304,999 B2 | 12/2007 | Sukonik et al. | |
| 7,362,762 B2 | 4/2008 | Williams, Jr. et al. | |
| 7,551,617 B2 * | 6/2009 | Eatherton et al. | 370/392 |
| 7,626,987 B2 | 12/2009 | Williams, Jr. et al. | |
| 7,630,376 B2 | 12/2009 | Williams, Jr. et al. | |
| 2002/0080789 A1 | 6/2002 | Henderson et al. | |
| 2004/0143712 A1 | 7/2004 | Armstrong et al. | |
| 2005/0100017 A1 * | 5/2005 | Williams et al. | 370/394 |
| 2005/0216461 A1 | 9/2005 | Williams et al. | |
| 2005/0220112 A1 * | 10/2005 | Williams et al. | 370/394 |
| 2005/0273400 A1 * | 12/2005 | Blankenship et al. | 705/28 |
| 2006/0179156 A1 * | 8/2006 | Eatherton et al. | 709/238 |
| 2006/0179204 A1 | 8/2006 | Cohen et al. | |
| 2006/0200647 A1 * | 9/2006 | Cohen | 712/34 |
| 2007/0014240 A1 * | 1/2007 | Kumar et al. | 370/231 |
| 2007/0022429 A1 | 1/2007 | Rosenbluth et al. | |
| 2007/0124728 A1 * | 5/2007 | Rosenbluth et al. | 718/100 |
| 2007/0198792 A1 | 8/2007 | Dice et al. | |
| 2008/0181229 A1 * | 7/2008 | Williams et al. | 370/394 |

OTHER PUBLICATIONS

Couloirs et al., Transactions and Concurrency Control, Distributed Systems Concepts and Design, Addison-Wesley Publishers, Third Ed., 2001, Chapter 12, pp. 456-514.

* cited by examiner

*Primary Examiner* — Chi Pham
*Assistant Examiner* — Kouroush Mohebbi
(74) *Attorney, Agent, or Firm* — The Law Office of Kirk D. Williams (57) ABSTRACT

Disclosed are, inter alia, methods, apparatus, computer-storage media, mechanisms, and means associated with cooperative flow locks distributed among multiple components, such as on different application-specific integrated circuits in a packet switching device. Flow locks are typically used for maintaining the order of packets and operations performed thereon by the coordination of a context (e.g., the processing of a packet by a packet processor) with a corresponding flow lock interface, and by the manner of communication performed among the flow lock interface and the distributed flow locks.

16 Claims, 9 Drawing Sheets

FLOW LOCK INTERFACE

FIGURE 3A

FLOW LOCK INTERFACE

FIGURE 3B

FLOW LOCK

FIGURE 4A

FLOW LOCK

FIGURE 4B

COOPERATIVE FLOW LOCKS DISTRIBUTED AMONG MULTIPLE COMPONENTS

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

In communicating packets, it is often desirable to maintain the order within a flow of packets. One way of maintaining the order within sequences of packets is to use ordered locks, also referred to as "flow locks." Flow locks may be particularly useful in a packet switching device for maintaining requisite packet orderings when distributing packets to be processed to different packet processing engines.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with cooperative flow locks distributed among multiple components, such as on different application-specific integrated circuits in a packet switching device. One embodiment includes a plurality of components, with each of the plurality of components being configured to maintain a plurality of flow locks. Each particular flow lock of these flow locks is associated with a queue for maintaining an ordering of packet identifiers (corresponding to packets) associated with the particular flow lock and is configured to perform one or more operations when the particular packet identifier acquires the flow lock (e.g., is at the head of the flow lock queue). One of these operations includes selectively converting from one particular flow lock on one component to a second particular flow lock on a different component; wherein said converting from said one particular flow lock to the second particular flow lock includes adding a packet identifier corresponding to the particular packet to the second particular flow lock and releasing said one particular flow lock.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with cooperative flow locks distributed among multiple components, such as on different application-specific integrated circuits in a packet switching device. A flow lock is a mutual exclusion lock with an ordered first-in first-out queue behind it. Any packet processing context (e.g., a process on a packet processing engine) that requires an operation protected by that lock must first acquire it by waiting in this queue. In one embodiment, packets (e.g., via a corresponding packet identifier) acquire one and only one flow lock at a time. A flow lock is first requested for the packet in the same order in which the packet arrived. This is typically referred to as the initial flow lock. As the packet is classified and more is found out about which "flow" the packet belongs to, the flow lock can be "converted" to a finer grained flow lock. This is done by requesting a convert operation, which requests that once a flow lock has been acquired a new flow lock is to be requested, releasing the old flow lock in the process. In this manner, the order of packets and packet operations is maintained.

A packet identifier represents a packet in a flow lock. In one embodiment, each packet has at any given time at most one and only one packet identifier and associated packet identifier state (except for maybe a short transitory period during a convert operation). In one embodiment, a convert operation will cause the current packet identifier to be deallocated and a new packet identifier to be allocated, possibly in a different component (e.g., different application-specific integrated circuit/ASIC). A flow lock queue is associated with each flow lock to maintain proper order. The flow lock queue is where packet identifiers wait (on behalf of their corresponding packets) to reach the head of the queue so that operations can be performed in the proper order. Packet identifiers in a flow lock queue are representatives for packets that are part of the same "flow" and are kept in strict order.

One common operation for a flow lock is to go from being at the head of one flow lock queue to the tail of a different flow lock queue in what is called a convert operation. This allows the ordering of packets to be relaxed to the point where only packets that belong to the same "flow" are in a given flow lock queue with order protection only for packets within that flow lock queue. A convert request to corresponding finer grained flow locks is typically issued as a packet is classified into a finer grained flow. Another common operation is to notify the packet processing engine processing a packet when the packet identifier corresponding to the packet has acquired the flow lock. This is called a send flow grant request. Once the packet processing engine receives a response from a send flow grant request, it has exclusive access to whatever is protected by that lock until it later requests a convert. Another common operation is to append packets to queues. This comes generally after all the processing is complete and the packet is ready to be transferred. The packet processing engine does not need to know when the packet meta data was actually enqueued, in fact, the packet processing engine can in most cases begin working on the next packet.

Certain operations can be offloaded and performed in order without the packet processing engine being involved in the critical section of the operation. These are handy for operations that must be performed in packet order on large "flows". These may include, but are not limited to, acquiring regular locks, generating or checking sequence numbers in memory, or the dynamic allocation of memory, including that used to store packets.

A "context" typically refers to the packet processor and state information concerning the processing of a packet. One embodiment includes one or more "extended contexts" for each packet processor, typically located in a flow lock interface on the same ASIC as the packet processor. An extended context is a sort of proxy to act as an intermediary between the context and the packet identifier. In one embodiment, there are two extended contexts for every context so that when a context has finished processing a packet it can begin processing a new packet before the processing of the previous packet has completed. The old extended context finalizes the work on the packet after the final convert, while work may begin on a new packet using a new extended context.

In one embodiment, an extended context includes: a global packet identifier identifying a current flow lock on one of the components, and an identification of the current packet identifier representing the packet in the current flow lock; a state machine for tracking commands; and a command queue for storing commands to be forwarded to the current or subsequent packet identifier.

The extended context keeps track of the progress of operations in order to know when it is safe to proceed to the next queued command. There are generally two types of operations that require the flow lock to update the state of the extended context. The first is a convert request. A convert request may request a flow lock existing in a same different chip. The second is a send flow grant, which is an indication at the request of the context that the packet identifier has reached the head of the flow lock queue and has "acquired" the flow lock. Attached operations unaccompanied by converts typically have the same semantics as send flow grants, in that when the context is notified that the operation is complete the context can infer that the packet identifier has reached the head of the flow lock queue and has "acquired" the flow lock. The context that has acquired the flow lock can access resources protected by that lock.

In one embodiment, every request sent to a packet identifier must have a response back to the extended context. That response may come in the form of a new packet identifier, or may come in the form of a flow lock grant (e.g., the packet identifier is at the head of the flow lock queue with nothing to do). Whether or not this response results in a response to the context depends on the type of request and the state of the extended context and command queue.

The local command queue is used primarily for storing commands to be forwarded to the correct packet identifier. These commands are forwarded as convert requests in the order in which they are received from the context. They are forwarded one at a time, each time receiving some indication that the previous command has completed.

In one embodiment, each packet identifier is a unique index to a packet identifier state that stores commands for a packet while waiting to get to the head of a flow lock queue. In one embodiment, each component has a pool of packet identifiers to allocate from when a flow lock request arrives. In one embodiment, the packet identifier state associated with a packet identifier contains the following data: a pointer to the extended context (e.g., so it knows where to send a response after a command has completed, such as grants and acknowledgments by the target flow lock in response to the completion of a convert operation informing the extended context that the packet identifier state is ready to accept more commands); a state machine for tracking flow lock events (e.g., whether or not to send a flow grant response, etc.); and a command store for storing commands to be dispatched when the packet identifier reaches the head of the flow lock queue. In one embodiment, the command storage can store a single convert request with a possible single attached command; and when the packet identifier reaches the head of the flow lock queue, if there is an attached command, the command is dispatched and either executed or piped with strict ordering to the resource where it is to be executed. In one embodiment, an attached command if it is present is always processed before its corresponding convert request; and a convert will leave the command store empty.

Embodiments may include, but are not limited to: methods, apparatus, computer-storage media, mechanisms, and means associated with cooperative flow locks distributed among multiple components, such as on different application-specific integrated circuits in a packet switching device.

One embodiment includes a plurality of components, with each of the plurality of components being configured to maintain a plurality of flow locks. Each particular flow lock of these flow locks is associated with a queue for maintaining an ordering of packet identifiers (corresponding to packets) associated with the particular flow lock and is configured to perform one or more operations when the particular packet identifier acquires the flow lock (e.g., is at the head of the flow lock queue). One of these operations includes selectively converting from one particular flow lock on one component to a second particular flow lock on a different component; wherein said converting from said one particular flow lock to the second particular flow lock includes adding a packet identifier corresponding to the particular packet to the second particular flow lock and releasing said one particular flow lock.

In one embodiment, each of said flow locks has associated with it a command queue configured to store one or more commands; wherein each of the plurality of components includes a flow lock interface configured for communicating commands to be stored in said command queues in each of the plurality of components. In one embodiment, each of the plurality of components includes one or more packet processors; wherein each packet processor of said packet processors is configured to communicate with the flow lock interface on said component on which the said packet processor resides for communicating said commands associated with packets being processed by said packet processor to said command queues in each of the plurality of components. In one embodiment, each flow lock interface of the plurality of flow lock interfaces includes one or more data structures stored in one or more computer-readable storage media for maintaining information related to flow locks of packets being processed on the component on which said flow lock interface resides; wherein said information includes an indication of a location of the current flow lock for each packet being processed on the component. In one embodiment, each flow lock interface of the plurality of flow lock interfaces is configured to store a plurality of commands related to flow locks of packets being processed on the component on which said flow lock interface resides. In one embodiment, said command queue of each of said flow locks is configured to store at most a single command. In one embodiment, each of said plurality of components is an application-specific integrated circuit (ASIC). In one embodiment, each flow lock interface of the plurality of flow lock interfaces is configured to store a plurality of commands related to flow locks of packets being processed on the component on which said flow lock interface resides. In one embodiment, said command queue of each of said flow locks is configured to store at most a single command. In one embodiment, each of said plurality of components is an application-specific integrated circuit (ASIC).

In one embodiment, a particular flow lock interface, on a component of a plurality of components of a packet switching device, adds a packet identifier corresponding to a particular packet to the end of queue of a flow lock on a first component of the plurality of components. In response to the packet identifier associated with a convert operation request acquiring the flow lock, the convert operation to a second flow lock on a second component, which is not the first component, of the plurality of components is performed; and in response to said performance of the convert operation, the second component communicates an acknowledgement message indentifying to the particular flow lock interface that the current location of a flow lock associated with the particular packet is the second flow lock.

In one embodiment, in response to receiving the acknowledgement message, the particular flow lock interface communicates an instruction to the second component which associates the instruction with a packet identifier corresponding to the particular packet; and when the packet identifier acquires the second flow lock, the instruction is performed. In one embodiment, the instruction corresponds to a convert operation to a flow lock on a component of the plurality of components different than the second component. In one embodiment, the instruction corresponds to a packet gather operation to cause a packet generated from processing of the particular packet to be sent from the packet switching device. In one embodiment, each particular flow lock of the flow lock and the second flow lock is configured to associate at most a single command with each packet identifier associated with the particular flow lock. In one embodiment, the acknowledgement message includes an identification of a new packet identifier associated with the particular packet.

One embodiment includes: a first component of a plurality of components in a packet switching device including means for adding a packet identifier corresponding to a particular packet to the end of queue of a flow lock; means for performing the convert operation to a second flow lock on a second component, which is not the first component, of the plurality of components in response to the packet identifier associated with a convert operation request acquiring the flow lock; and the second component including means for communicating an acknowledgement message indentifying to the particular flow lock interface that the current location of a flow lock associated with the particular packet is the second flow lock in response to said performance of the convert operation.

In one embodiment, the first component includes means for communicating an instruction to the second component in response to receiving the acknowledgement message; and wherein the second component includes: means for associating the instruction with a particular packet identifier, corresponding to the particular packet, in the second flow lock; and means for performing the instruction in response to the particular packet identifier acquiring the second flow lock. In one embodiment, the instruction corresponds to a convert operation to a flow lock on a component of the plurality of components different than the second component. In one embodiment, the instruction corresponds to a packet gather operation; and wherein the apparatus includes means for gathering a packet resulting from the processing of the particular packet and for sending said gathered packet from the packet switching device.

Figure 1A:
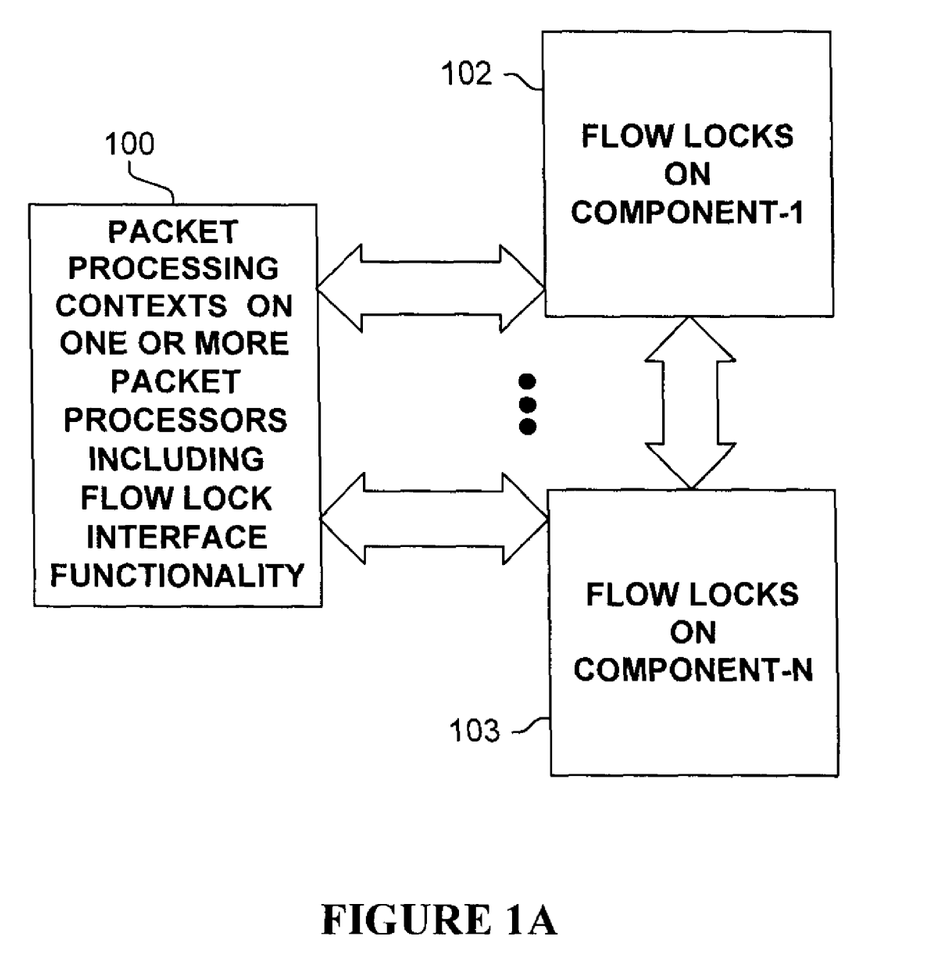
FIG. 1A illustrates a block diagram operating according to one embodiment.
Figure 1B:
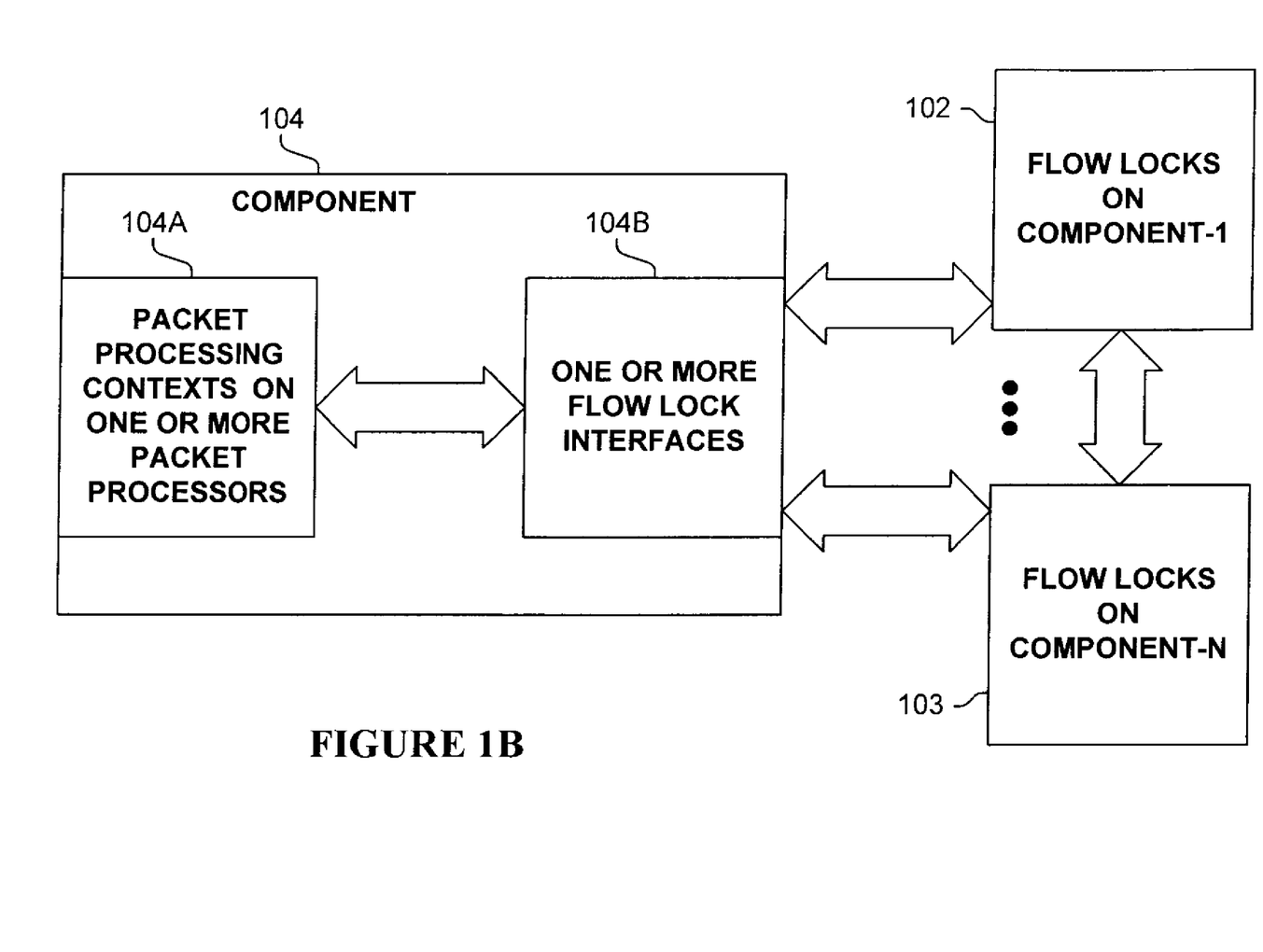
FIG. 1B illustrates a block diagram operating according to one embodiment.
Figure 1C:
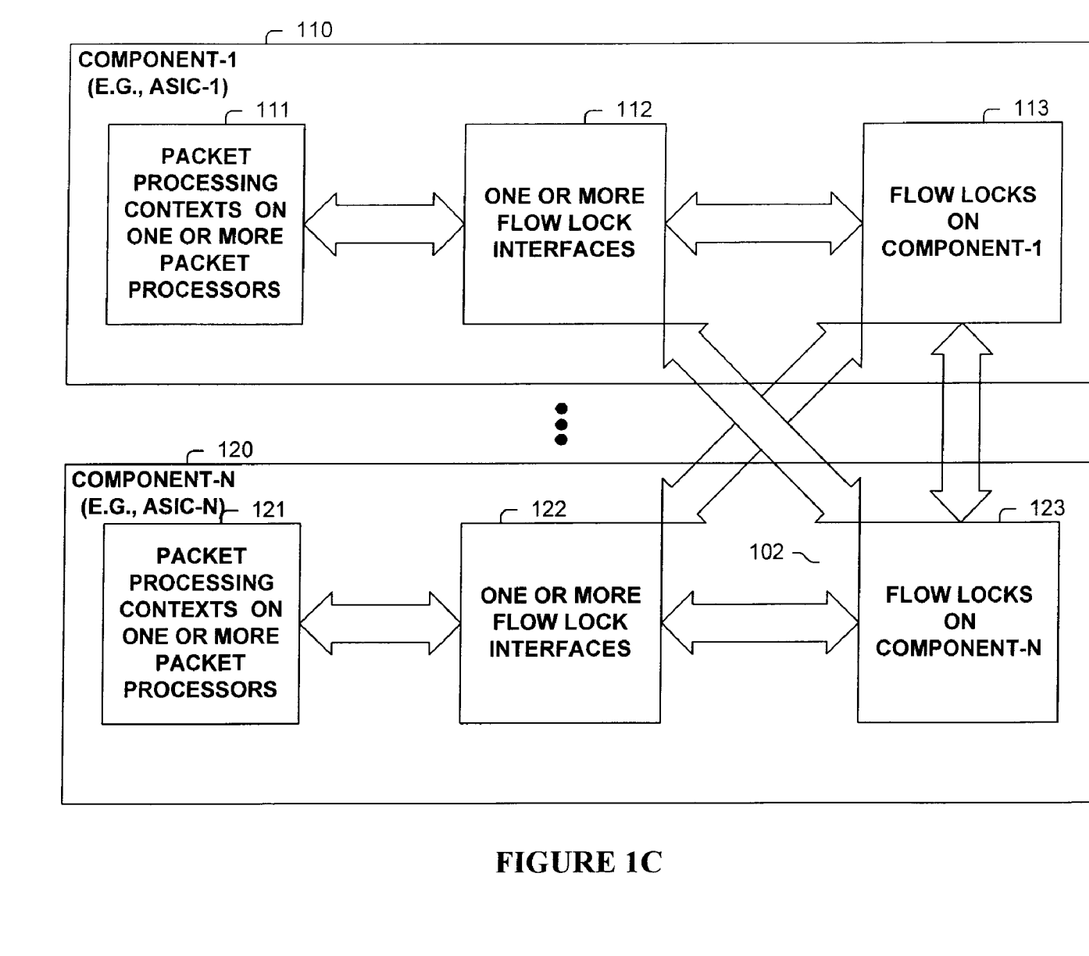
FIG. 1C illustrates a block diagram operating according to one embodiment.

Referring explicitly to the figures, each of FIGS. 1A-C illustrates a few of an extensible number of architectures employed in one embodiment. Note, the number of components used is one embodiment is extensible; and for example, one embodiment includes two (i.e., N=2); one embodiment includes four (i.e., N=4) flow locks; while one embodiment distributes flow locks among a smaller or larger number of components.

FIG. 1A illustrates one embodiment wherein element 100 includes packet processing contexts on one or more packet processors and includes the flow lock interface functionality for communicating with flow locks 102 on a first component and with flow locks 103 on a different component. Flow locks 102 and 103 communicate with each other (either directly or indirectly), such as for use in performing convert operations. Element 100 may be on a same or different component than flow locks 102 and/or 103.

FIG. 1B illustrates one embodiment wherein component 104 splits the packet processing contexts on one or more packet processors (104A) and one or more flow lock interfaces (104B) into separate processes or physical implementations. Flow lock interface 104B communicates with flow locks 102 on a first component and with flow locks 103 on a different component. Flow locks 102 and 103 communicate with each other (either directly or indirectly), such as for use in performing convert operations. Component 104 may be a same or different component than the components including flow locks 102 and/or 103.

FIG. 1C illustrates one embodiment including N components (e.g., ASICs) 110, 120. As shown, first component 110 includes packet processing contexts on one or more packet processors 111, one or more flow lock interfaces 112, and flow locks 113; while Nth component 120 includes packet processing contexts on one or more packet processors 121, one or more flow lock interfaces 122, and flow locks 123.

Figure 1D:
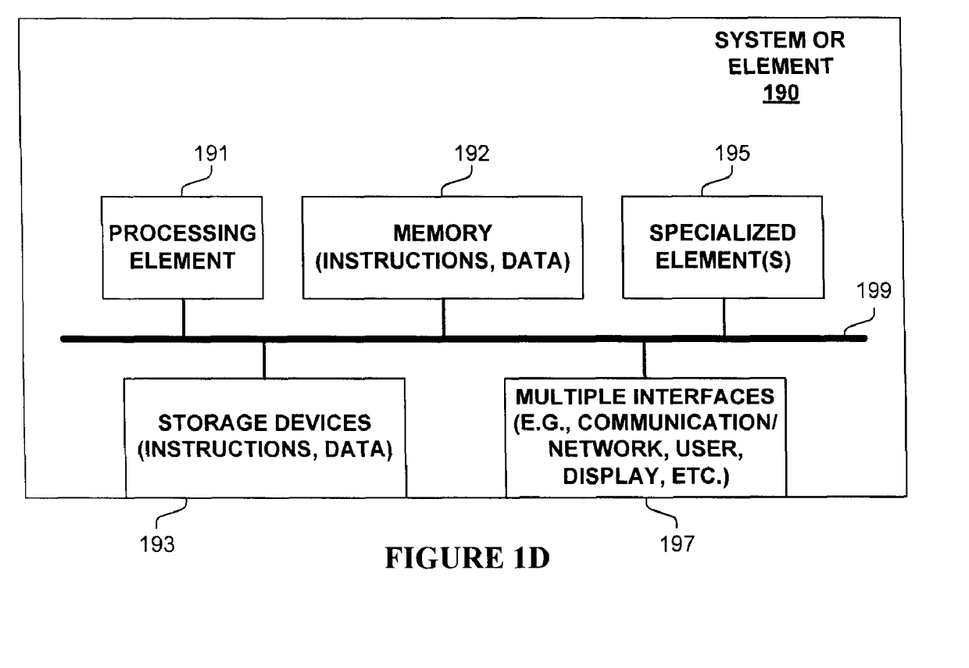
FIG. 1D illustrates an example system or component used in one embodiment.

FIG. 1D is block diagram of a system or element 190 used in one embodiment, such as for, or part of, a packet processor, flow lock interface, flow lock, or other implemented functionality. In one embodiment, system or element 190 performs one or more processes corresponding to one of the flow diagrams illustrated or otherwise described herein.

In one embodiment, system or element 190 includes a processing element 191, memory 192, storage devices 193, specialized elements 195 (e.g. optimized hardware such as for performing classification operations, etc.), and interface(s) 197 for communicating information (e.g., sending and receiving packets or messages, user-interfaces, displaying information, etc.), which are typically communicatively coupled via one or more communications mechanisms 199, with the communications paths typically tailored to meet the needs of the application.

Various embodiments of element 190 may include more or less elements. The operation of element 190 is typically controlled by processing element 191 using memory 192 and storage devices 193 to perform one or more tasks or processes. Memory 192 is one type of computer-readable/computer-storage medium, and typically comprises random access memory (RAM), read only memory (ROM), flash memory, integrated circuits, and/or other memory elements. Memory 192 typically stores computer-executable instructions to be executed by processing element 191 and/or data which is manipulated by processing element 191 for implementing functionality in accordance with an embodiment. Storage devices 193 are another type of computer-readable medium, and typically comprise solid state storage media, disk drives, diskettes, networked services, tape drives, and other storage devices. Storage devices 193 typically store computer-executable instructions to be executed by processing element 191 and/or data which is manipulated by processing element 191 for implementing functionality in accordance with an embodiment.

Figure 2:
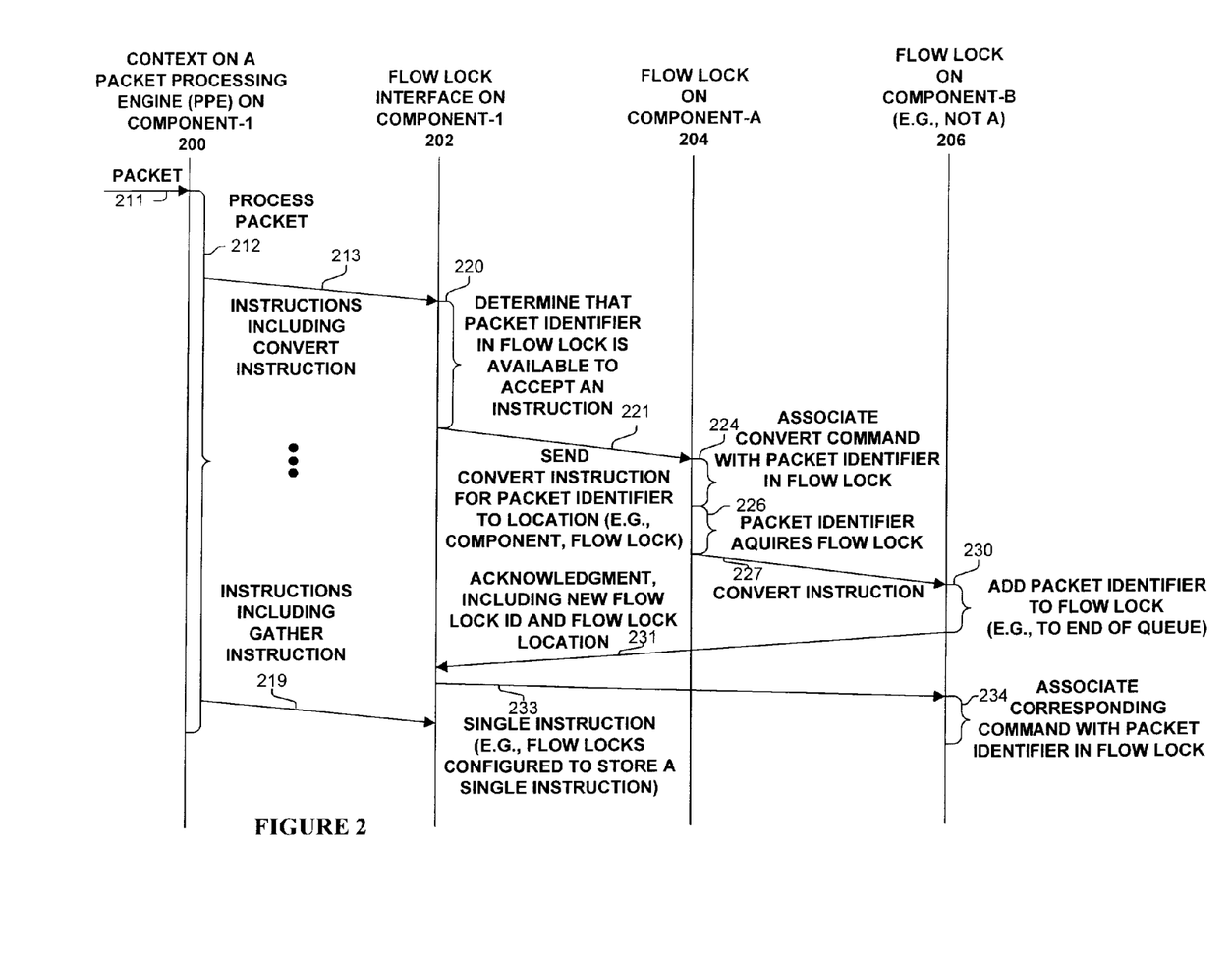
FIG. 2 illustrates some operations performed in one embodiment.

FIG. 2 illustrates a flow of messages and operations performed in one embodiment among: a context 200 on a packet processing engine on a first component; a flow lock interface 202 on the first component; flow lock 204 on a component-A; and flow lock 206 on a component-B. In one embodiment, component A corresponds to the first component; in one embodiment, component B corresponds to the first component; and in one embodiment, neither component A nor B corresponds to the first component. One embodiment distributes the flow locks used in a packet switching device across multiple components, with these flow locks possibly being distributed in a smart and/or random manner. The processing of the flow locks in a distributed manner across multiple components does not require the large amount of resources to be consumed by a single component configured to process all flow locks, and may provide a more scalable system.

As shown, a packet 211 is received and is processed (212) by context 200. At some point(s) during processing (e.g., after some packet classification operation to determine a new flow lock for the packet), context 200 communicates (203) instruction(s) to flow lock interface 202, which typically stores them (e.g., in a queue to maintain order) at least temporarily. In this example, a packet identifier corresponding to the processing of this packet by context 200 is currently in flow lock 204. Context 200 also generates and communicates (219) a gather instruction (e.g., to gather the header and packet data of processed packet 200 and to send it out) to flow lock interface 202 to communicate to the corresponding flow lock for execution at when a corresponding packet identifier with an associated gather instruction acquires a flow lock.

When flow lock interface 202 determines that flow lock 204 is available for receiving an instruction message (e.g., containing a command for it to store and then execute when the corresponding packet identifier acquires flow lock 204) for the packet identifier corresponding to context 200, it sends (221) the convert instruction (in this example) to convert from flow lock 204 to flow lock 206 to the location (e.g., component and flow lock) of the packet identifier. Flow lock 204 receives the instruction and associates (224) a convert command with packet identifier.

When this packet identifier acquires (226) flow lock 204, it sends (227) a convert instruction to flow lock 206, which adds (230) a packet identifier corresponding to context 200 to the end of the flow lock queue of flow lock 204, and also sends (231) an acknowledgment message to flow interface 202 informing it of the packet identifier and location (e.g., flow lock 206 on component-B). Flow lock interface 202 then typically sends (233) a single instruction (as in one embodiment, flow lock 206 can only store a single instruction for a packet identifier) to flow lock 206, which associates (234) the corresponding command with the packet identifier (such that the command will be executed when the packet identifier corresponding to context 200 acquires flow lock 206).

Figure 3A:
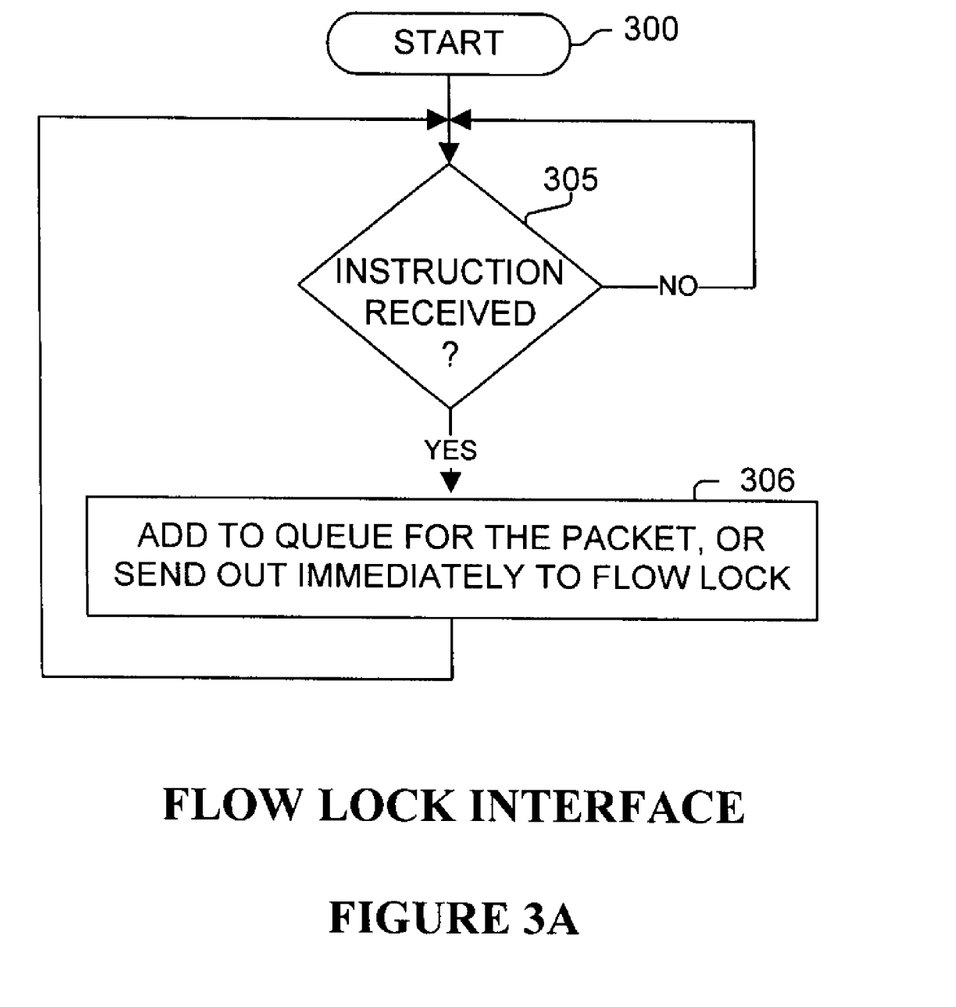
FIGS. 3A and 3B each illustrate a process performed in one embodiment.

FIG. 3A illustrates a process used in one embodiment by a flow lock interface. Processing begins with process block 300. As determined in process block 305, when an instruction is received from a context (typically on the same component as the flow lock interface), then in process block 306, the instruction is added to a queue or sent out immediately for associating with a packet identifier in a flow lock. Processing returns to process block 305.

Figure 3B:
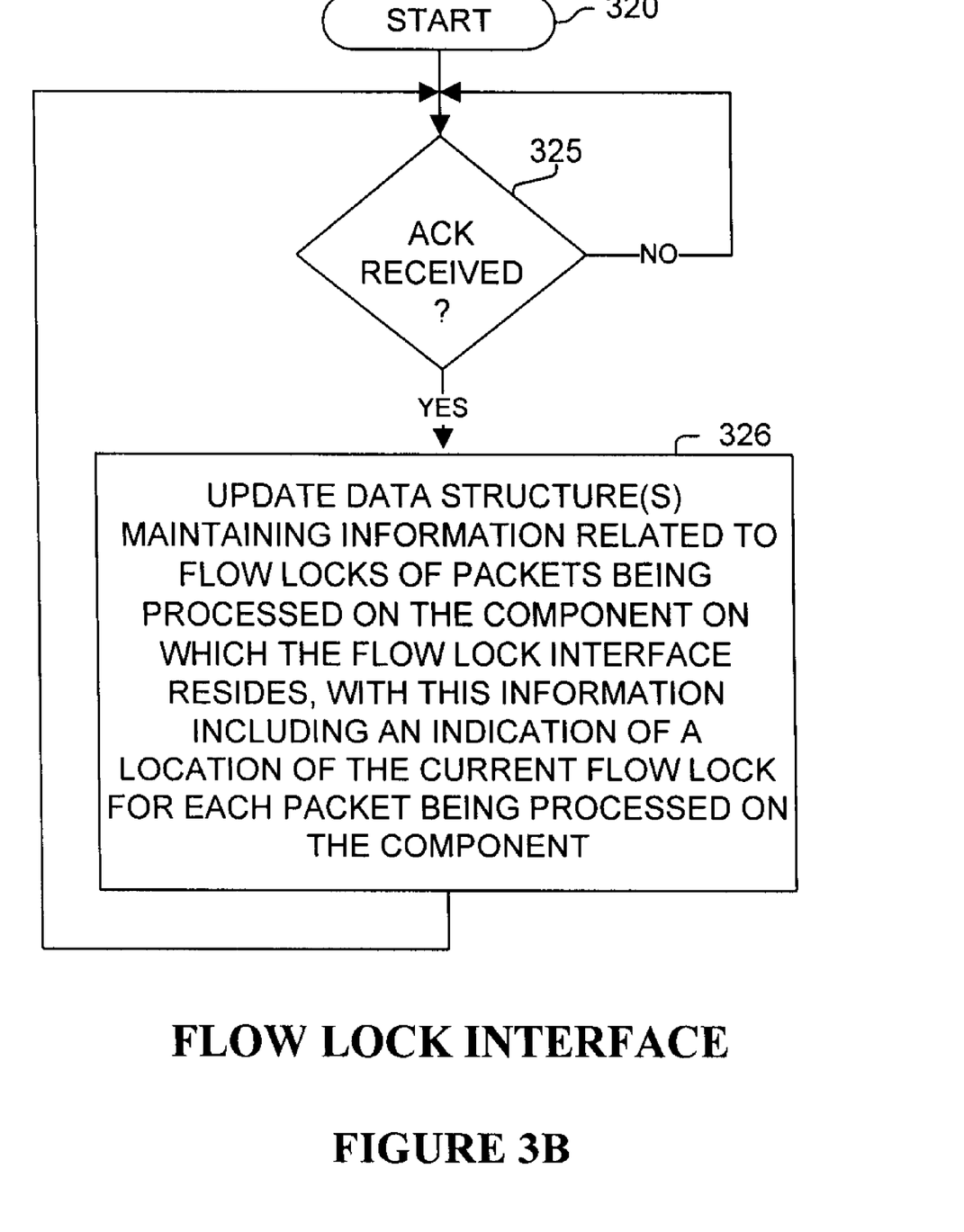

FIG. 3B illustrates a process used in one embodiment by a flow lock interface. Processing begins with process block 320. As determined in process block 325, when an acknowledgment message for a convert operation is received, then in process block 326, the flow lock interface updates one or more data structures maintaining information related to flow locks of packets being processed, with this information received in the acknowledgment including a new packet identifier and location (e.g., component, flow lock) of the new packet identifier. Processing returns to process block 325.

Figure 4A:
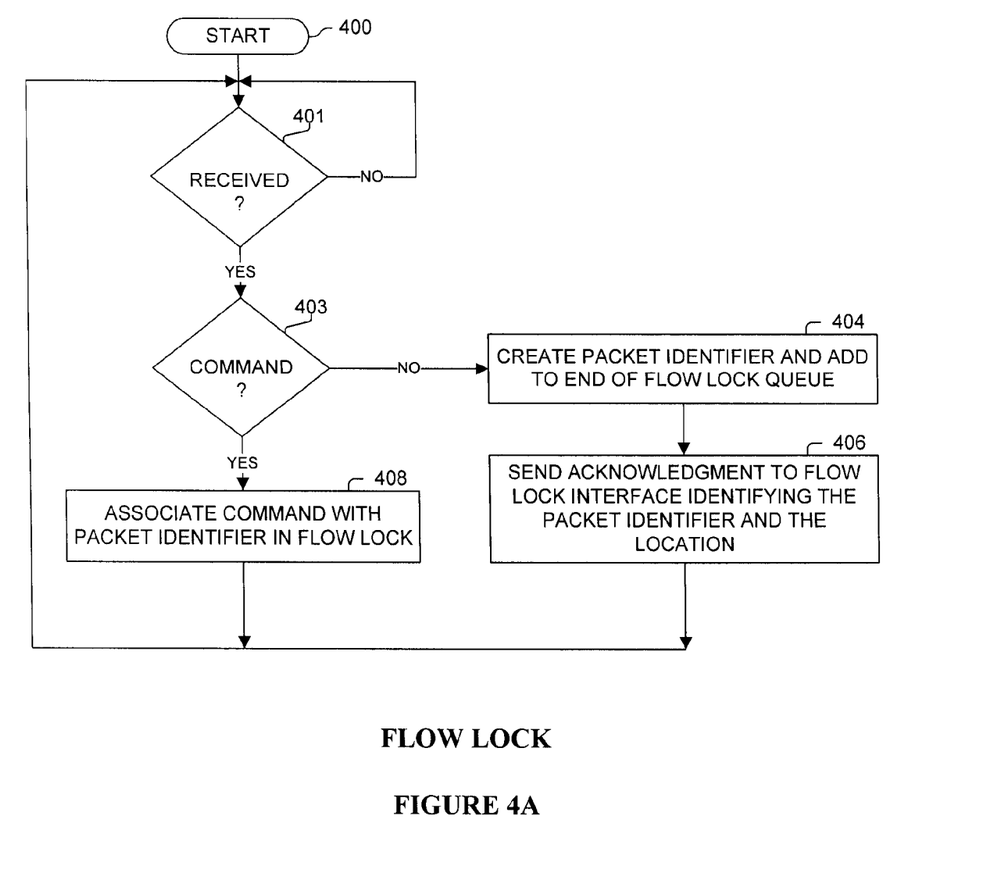
FIGS. 4A and 4B each illustrate a process performed in one embodiment.

FIG. 4A illustrates a process used in one embodiment by a flow lock. Processing begins with process block 400. As determined in process block 401, if a message (e.g., identifying a command to associate with a packet identifier, or identifying an actual convert operation being currently performed to the flow lock) is received, then as determined in process block 403, if it is a convert operation being performed, then in process block 404 a packet identifier is created and added to the end of the flow lock queue of the flow lock, and in process block 406, an acknowledgement is sent to the flow lock interface identifying the packet identifier and the location. Otherwise, in process block 408, the received command is associated with the packet identifier in the flow lock. Processing returns to process block 401.

Figure 4B:
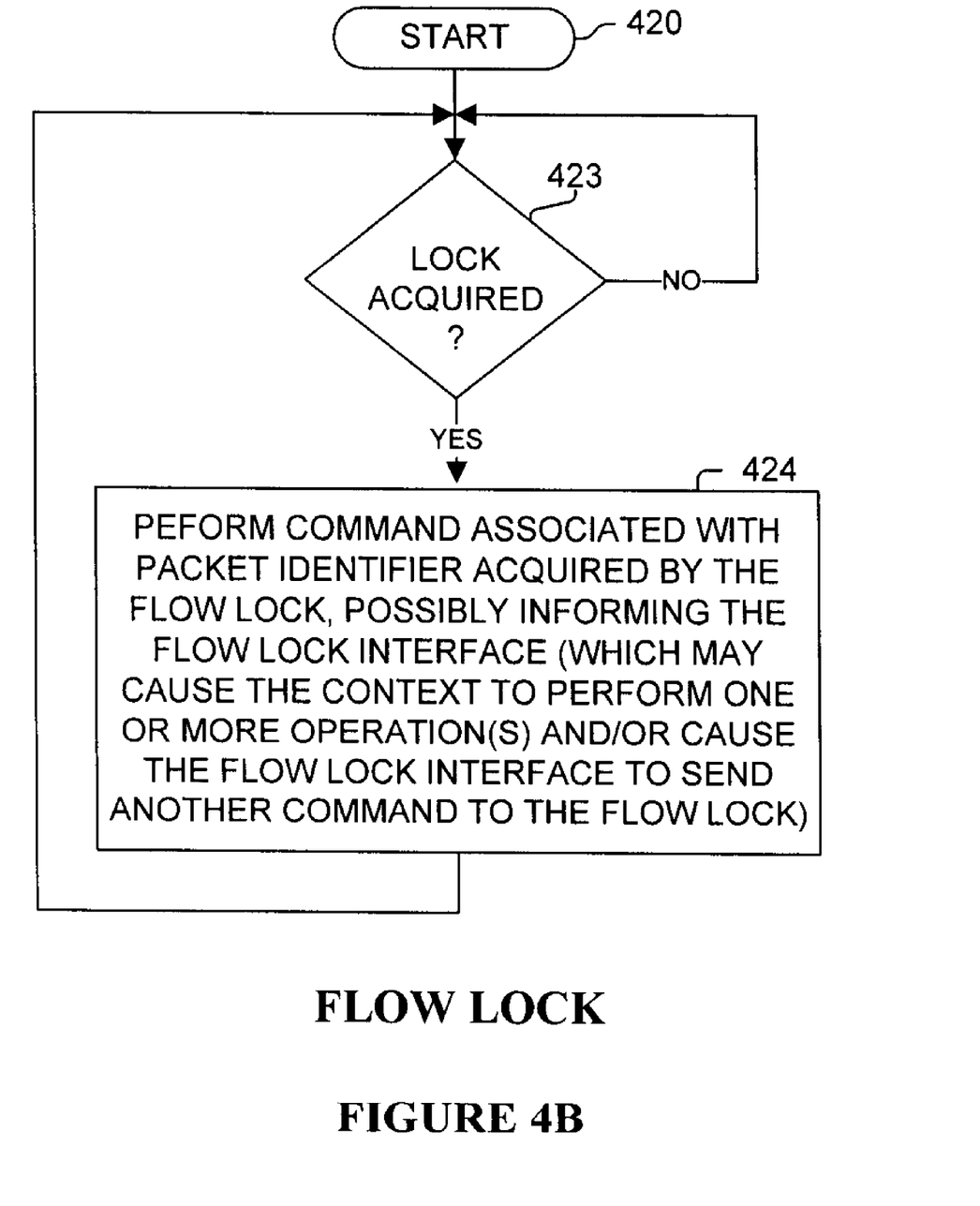

FIG. 4B illustrates a process used in one embodiment by a flow lock. Processing begins with process block 420. As determined in process block 423, when the flow lock is acquired by a packet identifier, the command associated with the packet identifier is performed, which may include informing the flow lock interface of the acquisition of the flow lock. Processing returns to process block 423.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
a plurality of components, each of the plurality of components being configured to maintain and process a plurality of flow locks in a distributed manner, wherein each of the plurality of components includes one or more packet processing contexts and one or more flow lock interfaces;
wherein each particular flow lock of the plurality of flow locks is associated with a queue for maintaining an ordering of packet identifiers associated with the particular flow lock; and wherein each particular flow lock of the plurality of flow locks is configured to perform one or more operations from a plurality of operations corresponding to a particular packet identifier corresponding to a particular packet when the particular packet identifier acquires the flow lock; wherein the plurality of operations includes selectively converting from one particular flow lock of said flow locks on one component of the plurality of components to a second particular flow lock of said flow locks on a different component of the plurality of components, which includes said one component communicating directly or indirectly with the different component in processing flow locks, including said one particular flow lock and the second particular flow lock, in a distributed manner; wherein said converting from said one particular flow lock to the second particular flow lock includes adding a packet identifier corresponding to the particular packet to the second particular flow lock and releasing said one particular flow lock;
wherein each of said flow locks has associated with it a command queue configured to store one or more commands; wherein each of the plurality of components includes a flow lock interface configured for communicating commands to be stored in said command queues in each of the plurality of components;
wherein each of the plurality of components includes one or more packet processors; wherein each packet processor of said packet processors is configured to communicate with the flow lock interface on said component on which the said packet processor resides for communicating said commands associated with packets being processed by said packet processor to said command queues in each of the plurality of components; and
wherein each flow lock interface of the plurality of flow lock interfaces includes one or more data structures stored in one or more computer-readable media for maintaining information related to flow locks of packets being processed on the component on which said flow lock interface resides; wherein said information includes an indication of a location of the current flow lock for each packet being processed on the component.

2. The apparatus of claim 1, wherein each flow lock interface of the plurality of flow lock interfaces is configured to store a plurality of commands related to flow locks of packets being processed on the component on which said flow lock interface resides.

3. The apparatus of claim 2, wherein said command queue of each of said flow locks is configured to store at most a single command.

4. The apparatus of claim 2, wherein each of said plurality of components is an application-specific integrated circuit (ASIC).

5. The apparatus claim 1, wherein each flow lock interface of the plurality of flow lock interfaces is configured to store a plurality of commands related to flow locks of packets being processed on the component on which said flow lock interface resides.

6. The apparatus of claim 5, wherein said command queue of each of said flow locks is configured to store at most a single command.

7. The apparatus of claim 1, wherein each of said plurality of components is an application-specific integrated circuit (ASIC).

8. A method, comprising:
a particular flow lock interface, on a component of a plurality of components of a packet switching device, adding a packet identifier corresponding to a particular packet to the end of queue of a flow lock on a first component of the plurality of components;
in response to the packet identifier associated with a convert operation request acquiring the flow lock, performing the convert operation to a second flow lock on a second component, which is not the first component, of the plurality of components, which includes the first component communicating directly or indirectly with the second component in processing flow locks, including the flow lock and the second flow lock, in a distributed manner; and
in response to said performance of the convert operation, the second component communicating an acknowledgement message identifying to the particular flow lock interface on the component that the current location of a flow lock associated with the particular packet is the second flow lock;

wherein each of the plurality of components includes one or more packet processing contexts and one or more flow lock interfaces.

9. The method of claim 8, comprising:

in response to receiving the acknowledgement message, the particular flow lock interface communicating an instruction to the second component which associates the instruction with a packet identifier corresponding to the particular packet; and wherein in response to packet identifier acquiring the second flow lock, performing the instruction.

10. The method of claim 9, wherein the instruction corresponds to a convert operation to a flow lock on a component of the plurality of components different than the second component.

11. The method of claim 9, wherein the instruction corresponds to a packet gather operation to cause a packet generated from processing of the particular packet to be sent from the packet switching device.

12. The method of claim 9, wherein each particular flow lock of the flow lock and the second flow lock is configured to associate at most a single command with each packet identifier associated with the particular flow lock.

13. The method of claim 8, wherein the acknowledgement message includes an identification of a new packet identifier associated with the particular packet.

14. An apparatus, comprising:

a plurality of components, each of the plurality of components being configured to maintain and process a plurality of flow locks in a distributed manner, wherein each of the plurality of components includes one or more packet processing contexts and one or more flow lock interfaces;

wherein each particular flow lock of the plurality of flow locks is associated with a queue for maintaining an ordering of packet identifiers associated with the particular flow lock; and wherein each particular flow lock of the plurality of flow locks is configured to perform one or more operations from a plurality of operations corresponding to a particular packet identifier corresponding to a particular packet when the particular packet identifier acquires the flow lock; wherein the plurality of operations includes selectively converting from one particular flow lock of said flow locks on one component of the plurality of components to a second particular flow lock of said flow locks on a different component of the plurality of components, which includes said one component communicating directly or indirectly with the different component in processing flow locks, including said one particular flow lock and the second particular flow lock, in a distributed manner; wherein said converting from said one particular flow lock to the second particular flow lock includes adding a packet identifier corresponding to the particular packet to the second particular flow lock and releasing said one particular flow lock.

15. The apparatus of claim 14, wherein each of said flow locks has associated with it a command queue configured to store one or more commands; wherein each of the plurality of components includes a flow lock interface configured for communicating commands to be stored in said command queues in each of the plurality of components.

16. The apparatus of claim 15, wherein each of the plurality of components includes one or more packet processors; wherein each packet processor of said packet processors is configured to communicate with the flow lock interface on said component on which the said packet processor resides for communicating said commands associated with packets being processed by said packet processor to said command queues in each of the plurality of components.

* * * * *